(No Model.)
H. N. TIMMS.
MOVABLE STAND FOR BICYCLES.
No. 563,819. Patented July 14, 1896.
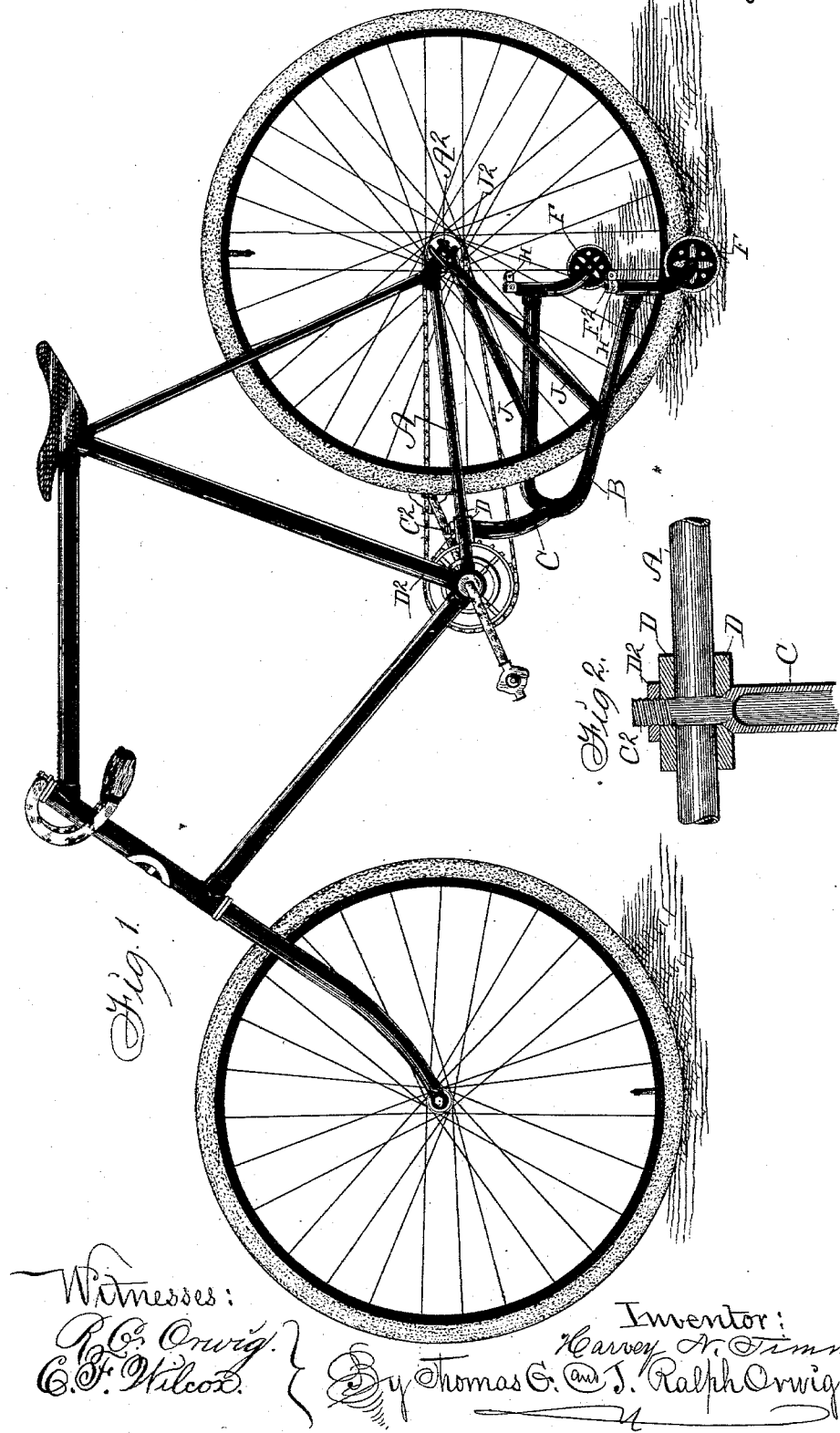

UNITED STATES PATENT OFFICE.

HARVEY N. TIMMS, OF DES MOINES, IOWA.

MOVABLE STAND FOR BICYCLES.

SPECIFICATION forming part of Letters Patent No. 563,819, dated July 14, 1896.

Application filed September 9, 1895. Serial No. 561,979. (No model.)

*To all whom it may concern:*

Be it known that I, HARVEY N. TIMMS, a citizen of the United States of America, residing at Des Moines, in the county of Polk and State of Iowa, have invented an Improved Movable Stand for Bicycles, of which the following is a specification.

My invention relates to a bicycle stand and support invented by myself and fully shown and described in an application for United States Letters Patent, Serial No. 546,841, filed April 23, 1895.

My object is to provide a device for the accomplishment of the same purposes contemplated in my former application, but which will not interfere with the movements of the rider in mounting or dismounting and may be readily and quickly attached to or detached from a wheel and which will be of comparatively light weight and not liable to break by spreading of the caster-wheels.

My object is further to lessen the cost of construction by so arranging the parts that the device may readily turn corners without having the wheels thereon pivoted.

My invention consists in certain details in the construction, arrangement, and combination of the various parts of the device, as hereinafter set forth, pointed out in the claims, and illustrated in the accompanying drawings, in which—

Figure 1 is a perspective view showing the device applied to a bicycle. Fig. 2 is a detail sectional view of the means for connecting the device to a bicycle.

Referring to the accompanying drawings, the reference-letter A is used to indicate that part of the frame leading from the crank-bracket to the rear axle, and $A^2$ indicates the rear axle. The attachment comprises a metal tube B, curved forwardly at its central portion, designed to be supported in a horizontal plane between the wheels of a bicycle, with its ends extended rearwardly and outwardly by means of an upright C, brazed to the central portion of the part B and having a screw-threaded rod $C^2$ fixed in its upper end.

D D indicate two plates, each provided with a central opening to admit said rod and designed to be placed on the top and under sides of the parts A of the frame and have the rod $C^2$ passed therethrough. A nut $D^2$ on the end of the rod serves to firmly clamp the parts together.

F F indicate two caster-wheels having vertical journals $F^2$ extended through the ends of the part B and secured in place by means of the clamp H.

J J indicate two braces, also made of tubing and leading from the tube B to the rear axle. They are slotted at $J^2$ to admit the axle.

I am aware that heretofore casters have been supported at the sides of a bicycle to prevent the same from falling, but such supports have always comprised an upright attached to each caster and fixed to an elevated part of the frame, and it has been found that with such a construction a lateral strain on the wheel will tend to spread the caster and thus weaken or break the upright. By attaching the two casters to one bar that stands in a horizontal plane the casters cannot be spread.

In the accompanying drawings it will be seen that the caster-wheels are in direct alinement with the vertical center of the rear wheel, and it is obvious that when the wheels are so located they need not be pivotally attached to the support.

Having thus described my invention, what I claim as new therein, and desire to secure by Letters Patent, is—

1. A movable stand for safety-bicycles, comprising an approximately U-shaped cross-piece, designed to stand in an approximately horizontal plane, wheels on its ends, an upright fixed to its central portion and a suitable clamp at its top designed to be secured to the rear braces of a bicycle-frame between the crank-bracket and rear wheel and braces attached to the end portions of the said cross-piece to engage the axle of the rear wheel, substantially as set forth.

2. A movable stand for bicycles, comprising an approximately U-shaped cross-bar, an upright at its central portion a clamp on said upright designed to be detachably and adjustably secured to the rear braces of a bicycle-frame between the crank-bracket and rear wheel, braces connected with said U-shaped cross-piece and designed to be secured to the rear axle of a bicycle and wheels on the ends of the said cross-piece in alinement with the contact-point of the rear wheel of a bicycle, substantially as and for the purposes stated.

HARVEY N. TIMMS.

Witnesses:
S. C. SWEET,
J. RALPH ORWIG.